US010356746B2

(12) United States Patent
Koodli et al.

(10) Patent No.: US 10,356,746 B2
(45) Date of Patent: Jul. 16, 2019

(54) METHOD AND APPARATUS FOR INTERNET SERVICE AVAILABILITY NOTIFICATION

(71) Applicant: Google Inc., Mountain View, CA (US)

(72) Inventors: Rajeev Koodli, Saratoga, CA (US); Hassan Sipra, San Jose, CA (US); Alan Jones, Sunnyvale, CA (US); Francis Tsui, Belmont, CA (US); Bok Knun Randolph Chung, Los Altos, CA (US)

(73) Assignee: Google LLC, Mountain View, CA (US)

( * ) Notice: Subject to any disclaimer, the term of this patent is extended or adjusted under 35 U.S.C. 154(b) by 87 days.

(21) Appl. No.: 15/339,707

(22) Filed: Oct. 31, 2016

(65) Prior Publication Data
US 2018/0124740 A1    May 3, 2018

(51) Int. Cl.
  H04W 68/02    (2009.01)
  H04W 24/08    (2009.01)
  (Continued)

(52) U.S. Cl.
  CPC .......... *H04W 68/02* (2013.01); *H04B 7/1851* (2013.01); *H04B 7/18504* (2013.01);
  (Continued)

(58) Field of Classification Search
  None
  See application file for complete search history.

(56) References Cited

U.S. PATENT DOCUMENTS 6,404,754 B1    6/2002   Lim
8,908,591 B2 *  12/2014  Luyks ................... H04W 48/20
                                                370/252
(Continued)

FOREIGN PATENT DOCUMENTS

EP    1965571 A1    9/2008
WO    2007000175 A1    1/2007
WO    2007/077583 A1    7/2007

OTHER PUBLICATIONS

Ramjee, R., et al. "IP-based Access Network Infrastructure for Next Generation Wireless Data Networks" IEEE Personal Communications, vol. 7, No. 4, Aug. 2000.
(Continued)

*Primary Examiner* — Donald L Mills
(74) *Attorney, Agent, or Firm* — McDermott Will & Emery LLP

(57) ABSTRACT

Internet Connectivity Services provided by mobile wireless stations deployed in drones, balloons, airplanes etc. may be intermittent and in some cases event-driven, such as in response to emergency and natural disasters. In such deployments, end users of wireless devices may not know that Internet connectivity has become available. Even when the wireless device, such as a smartphone, is able to autonomously attach to the network when Internet connectivity becomes available, end users may not realize that their devices have re-connected to the network. The proposed systems and methods relate to providing Internet service availability notification to end users. The proposed systems and methods collect data related to Internet service availability notifications for analytics.

23 Claims, 5 Drawing Sheets

(51) Int. Cl.
*H04W 72/04* (2009.01)
*H04B 7/185* (2006.01)

(52) U.S. Cl.
CPC ........ *H04B 7/18508* (2013.01); *H04W 24/08* (2013.01); *H04W 72/0453* (2013.01)

(56) References Cited

U.S. PATENT DOCUMENTS

| | | | |
|---|---|---|---|
| 9,763,167 B2* | 9/2017 | Gopal | H04W 40/246 |
| 2003/0118015 A1 | 6/2003 | Gunnarsson et al. | |
| 2005/0025085 A1* | 2/2005 | King | H04B 1/40 |
| | | | 370/315 |
| 2009/0154391 A1* | 6/2009 | Wittenschlaeger | H04B 7/19 |
| | | | 370/316 |
| 2013/0005338 A1* | 1/2013 | Yach | H04M 1/72519 |
| | | | 455/435.2 |
| 2014/0108022 A1 | 4/2014 | Schoenberg | |
| 2016/0112896 A1* | 4/2016 | Karampatsis | H04W 28/0252 |
| | | | 370/230.1 |
| 2016/0113006 A1* | 4/2016 | Murphy | H04W 24/04 |
| | | | 370/338 |
| 2016/0135208 A1* | 5/2016 | Choi | H04W 76/14 |
| | | | 370/329 |
| 2016/0192211 A1* | 6/2016 | Park | H04W 24/02 |
| | | | 370/252 |
| 2016/0360466 A1* | 12/2016 | Barak | H04W 8/26 |
| 2017/0201979 A1* | 7/2017 | Murphy | H04W 72/0433 |
| 2017/0372332 A1* | 12/2017 | Shachar | G06Q 30/0201 |

OTHER PUBLICATIONS

Sun, Jun-Zhao, et al. "Mobile IP Applicability: When Do We Really Need It?" Proceedings of the 2004 International conference on Parallel Processing Workshops, pp. 116-123, Aug. 2004.
International Search Report and Written Opinion dated Feb. 19, 2018 in International (PCT) Application No. PCT/US2017/058484.

* cited by examiner

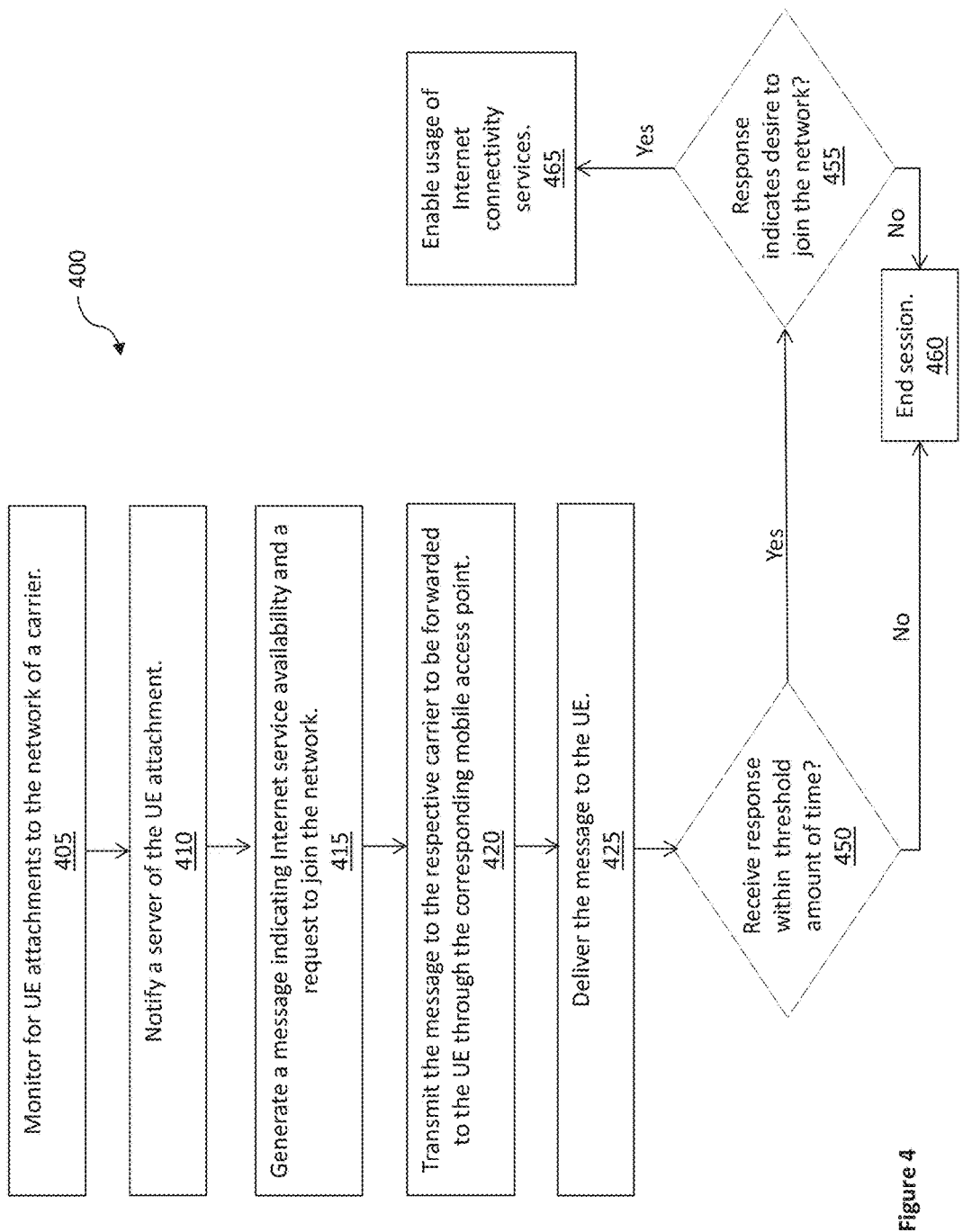

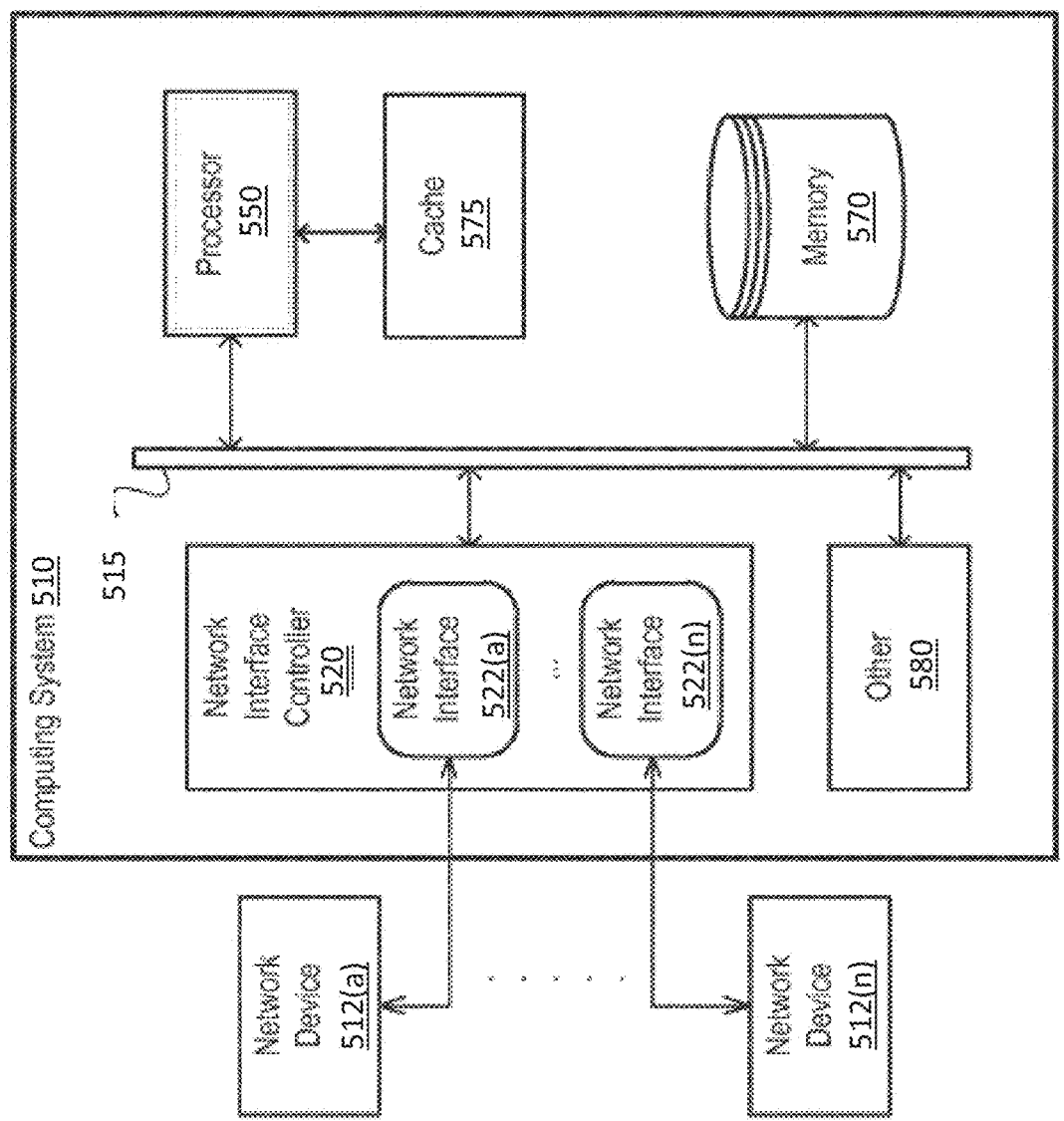

METHOD AND APPARATUS FOR INTERNET SERVICE AVAILABILITY NOTIFICATION

BACKGROUND

Internet Connectivity Services provided by mobile wireless stations deployed in drones, balloons, airplanes etc. may be intermittent and in some cases event-driven, such as in response to emergency and natural disasters. In such deployments, end users of wireless devices may not know that Internet connectivity has become available.

SUMMARY

According to one aspect, the subject matter described in this disclosure relates to a method that includes receiving from a plurality of access nodes indications of successful attachments of a plurality of user equipment with a plurality of different respective telecommunications carriers through corresponding ones of the plurality of access nodes, wherein the user equipment are in communication with the corresponding access nodes via one or more mobile access points. The method further includes transmitting service availability notifications to the respective carriers to be forwarded by the respective carriers to the user equipment through the corresponding access nodes.

According to another aspect, the subject matter described in this disclosure relates to a system that includes one or more processors implementing a client. The client is configured to receive from a plurality of access nodes indications of successful attachments of a plurality of user equipment with a plurality of different respective telecommunications carriers through corresponding ones of the plurality of access nodes, wherein the user equipment are in communication with the corresponding access nodes via one or more mobile access points. The system further includes one or more servers that are configured to transmit service availability notifications to the respective carriers to be forwarded by the respective carriers to the user equipment through the corresponding access nodes.

According to another aspect, the subject matter described in this disclosure relates to a non-transitory computer readable medium having instructions encoded thereon which, when executed by one or more processors, cause the one or more processors to perform a method that includes receiving from a plurality of access nodes indications of successful attachments of a plurality of user equipment with a plurality of different respective telecommunications carriers through corresponding ones of the plurality of access nodes, wherein the user equipment are in communication with the corresponding access nodes via one or more mobile access points. The method further includes transmitting service availability notifications to the respective carriers to be forwarded by the respective carriers to the user equipment through the corresponding access nodes.

BRIEF DESCRIPTION OF THE DRAWINGS

The foregoing will be apparent from the following more particular description of example implementations of the invention, as illustrated in the accompanying drawings. The drawings are not necessarily to scale, emphasis instead being placed upon illustrating implementations of the present invention.

FIG. 4 is a flow diagram of an Internet notification method that includes requesting the end user to indicate whether the end user desires to join the available network, executed by the Internet connectivity system shown in FIG. 2.

FIG. 5 is a diagram of a computing system suitable for use in the various implementations described.

For purposes of clarity, not every component may be labeled in every figure. The drawings are not intended to be drawn to scale. Like reference numbers and designations in the various figures indicate like elements.

DETAILED DESCRIPTION

Internet connectivity services provided by mobile wireless stations deployed in drones, balloons and airplanes, etc. may be intermittent and in some cases event-driven, such as in response to emergency and natural disasters. In such deployments, end users of wireless devices may not know that Internet connectivity has become available. Even when the wireless device, such as a smartphone, is able to autonomously attach to the network when Internet connectivity becomes available, end users may not realize that their devices have connected to the network.

Systems and methods according to the present disclosure relate to the provision of Internet service availability notifications to end users of wireless devices. The disclosure describes a client process configured to detect a user device successfully attaching to a carrier network through a mobile access point. The client process identifies the user device associated with the detected attachment and notifies a server process that is independent from the carrier of the device attachment. The server process responds to the received notification of device attachment by initiating the generation of an Internet service availability notification message indicating that Internet service has become available. The server process transmits the Internet service availability notification message to the carrier to be delivered by the carrier to the user device through the mobile access point.

The proposed systems and methods decouple notification message delivery mechanics and notification messaging control. Carrier interfaces are used for delivering the notifications while the server process, which is carrier independent, is responsible for notification messaging control, thereby providing autonomy of message origination, error handling and analytics. By having Internet service availability messages being generated and controlled by servers and processes that are independent of any given carrier, the operator of the mobile access points which interoperate with multiple carriers as the mobile access points travel across multiple carrier access regions can control the user experience for users across carriers and more readily collect usage and attachment statistics that it can use to improve its future services and tailor its current services to current loads on the mobile access points. The present disclosure also provides systems and methods for collecting data related to Internet service availability notifications for analytics.

Figure 1:
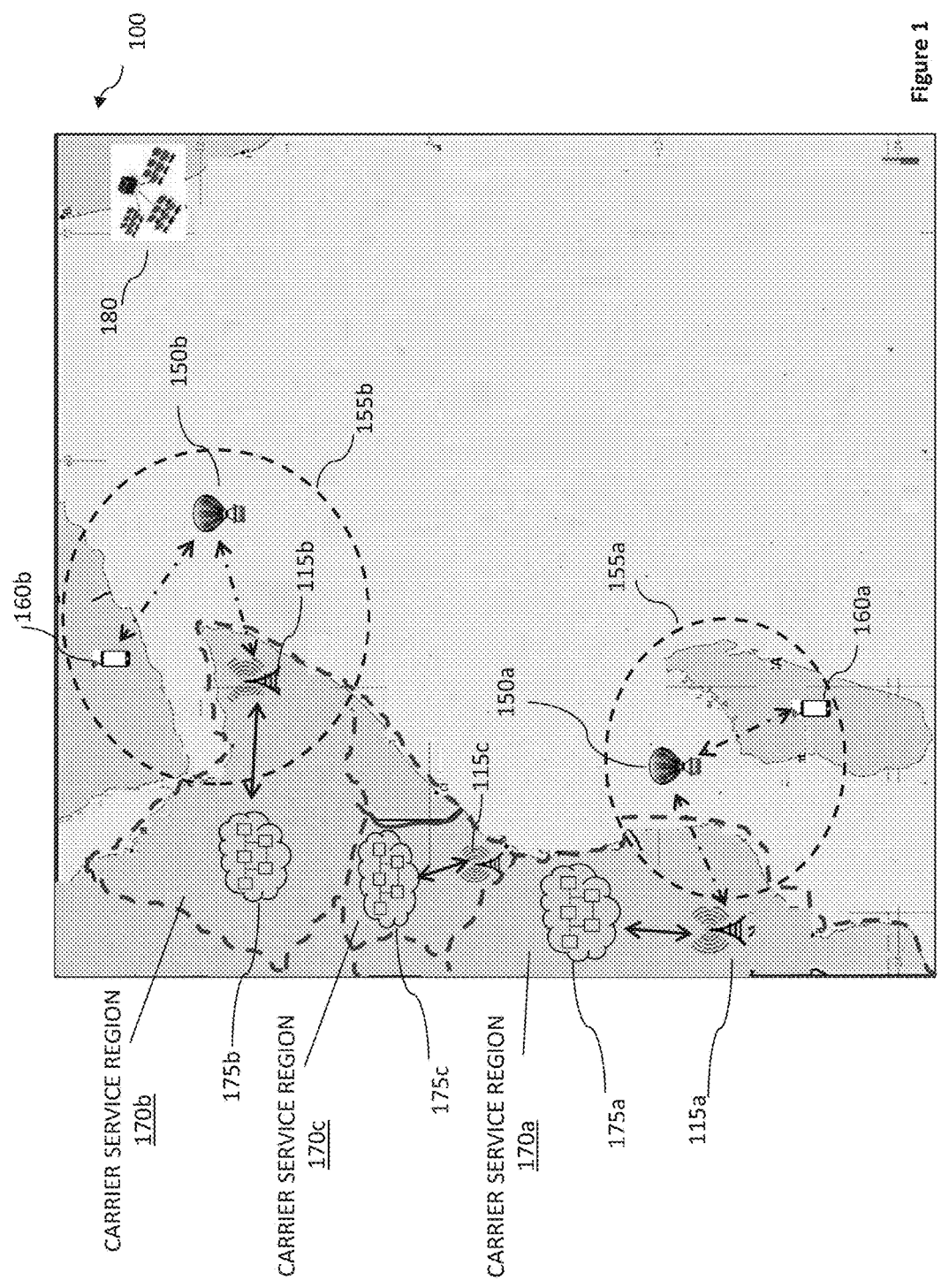
FIG. 1 is a diagram of an environment in which Internet service availability notifications are provided according to an example implementation.

FIG. 1 is a diagram of an environment 100 in which Internet notification is provided according to an example implementation. Environment 100 can include user devices such as a first User Equipment (UE) 160a and a second UE 160b (generally referred to as UEs 160). In some implementations, UEs 160 can be smartphones, laptops, tablets, etc. that are mobile or stationary. In some implementations, any number of UEs can be located in any number of geographical locations within environment 100.

Environment 100 can include one or more mobile wireless access points, each having a respective mobile access point service region. FIG. 1 shows a first mobile access point 150a with a first mobile access point service region 155a and a second mobile access point 150b with a second mobile access point service region 155b (generally referred to as mobile access points 150 and mobile access point service regions 155). As the mobile access points 150 navigate through environment 100, the UEs 160 and the mobile access points 150 can communicate with each other when the UEs 160 are within the respective mobile access point service regions 155. In some implementations, any number of mobile access points 150 may be provided in any number of geographical locations. In some implementations, the mobile access points 150 can be eNodeB base stations (or may provide the layer 1 and layer 2 functionality of an eNodeB base station) or other wireless access points. In some implementations, the mobile access points 150 can communicate with one another in addition to communicating with UEs 160.

Environment 100 can also include a first ground station 115a, a second ground station 115b and a third ground station 115c (generally referred to as ground stations 115). Ground stations 115 and mobile access points 150 can be configured to communicate with one another. Environment 100 can also include one or more telecommunications carriers or Internet service providers, each providing Internet services within a geographical area or governmental jurisdiction (for example, a country, province, canton, county, city, etc.), referred to as a carrier service region. FIG. 1 shows three carrier service regions 170a-170c (generally referred to as carrier service regions 170), each serviced by a respective carrier 175a-175c (generally referred to as carriers 175). The UEs 160, when located within the carrier service regions 170, can connect to the carriers 175 via the ground stations 115 and access Internet service provided by the carriers 175 via the mobile access points 150 and ground stations 115.

In FIG. 1, one or more of the UEs 160 may not have access to Internet service because the UEs 160 are located outside the carrier service regions 170. As the mobile access points 150 navigate through environment 100, a UE 160, when entering the mobile access point service region 155 of a mobile access point can connect to a carrier 175 through the mobile access point 150 and a ground station 115. In FIG. 1, the UE 160a is located outside of the carrier service regions 170 but is located within the mobile access point service region 155a corresponding to the mobile access point 150a. The UE 160a can attempt to connect to the carrier 175a through the mobile access point 150a and the ground station 115a. When a connection is successfully established between the UE 160a and the carrier 175a through the mobile access point 150a and ground station 115a, the UE 160a can access Internet service provided by the carrier 175a through the ground station 115a and the mobile access point 150a.

Environment 100 can include a data center 180. The data center 180 can include one or more processes running on one more servers. When the UE 160a successfully attaches to the network of the carrier 175a, an indication of the successful UE 160a attachment to the carrier 175a can be sent to a process running on a server located in the data center 180. Subsequently, the process running on a server in the data center 180 can generate an Internet service availability notification and can transmit it to carrier 175a. The carrier 175a forwards the Internet service availability notification to the UE 160a via the ground station 115a and the mobile access point 150a. When the UE 160a receives the notification, the end user is notified that Internet service has become available. It is valuable for the end users of UEs 160 to be notified when Internet service becomes available. Such a notification is important even when the UEs 160 are able to autonomously attach to the network of carriers 175 when Internet service becomes available because the end users of the UEs 160 may not realize that their devices have connected to the network.

Figure 2:
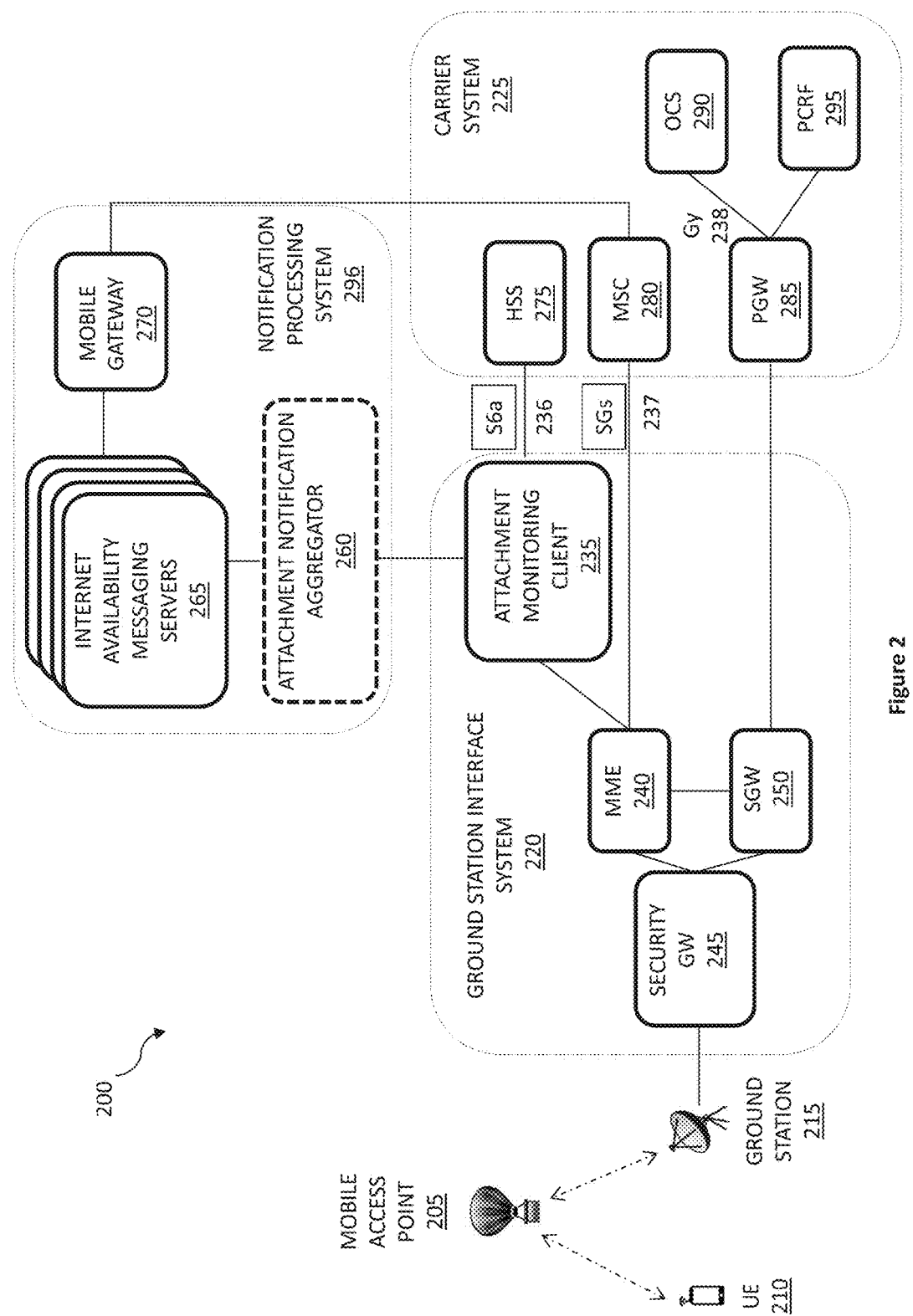
FIG. 2 is a block diagram of a system for providing Internet connectivity (also referred to as the "Internet connectivity system").

FIG. 2 is a block diagram of a system 200 for providing Internet connectivity (also referred to as the "Internet connectivity system 200"). The Internet connectivity system 200 includes a ground station 215, a ground station interface system 220, a carrier system 225 and a notification processing system 296. In some implementations, the Internet connectivity system 200 may be part of a network such as a Long-Term Evolution (LTE) 4G network. In broad overview, the Internet connectivity system 200 enables a user equipment (UE) 210, such as the UEs 160 shown in FIG. 1, to connect to a carrier network via a mobile access point 205, such as the mobile access points 150, shown in FIG. 1, and a ground station 215, such as the ground stations 115, also shown in FIG. 1, thereby gaining access to the Internet and other telecommunications services.

As indicated above, the Internet connectivity system 200 includes a ground station interface system 220. The ground station interface system 220 is generally configured to serve as an access node between a carrier network and the UE via a ground station 215 and a mobile access point 205. It can provide the user plane and control plane protocol terminations of an LTE network, often provided by an e-NodeB. In some implementations, the ground station interface system 220 can serve as an Internet Protocol (IP) access gateway. To that end, the ground station interface system 220 implements several network functions, including an Internet Protocol security gateway function 245, a mobility management entity function 240 and a service gateway function 250. As used herein, a network function refers to computer executable instructions, stored in non-transitory computer readable media, such as computer memory, which are executed by a general or special purpose processor. The instructions cause the processor to carry out the functionality associated with the network function. In some other implementations, a network function refers to a special-purpose integrated circuit processor, such as an ASIC, configured to carry out similar functionality.

A security gateway (Security GW) network function, such as the Security GW 245 of the ground station interface 220, serves as a secure gateway at the edge of the ground station interface system 200 network. In some implementations, the Security GW 245 can be an IP security gateway (IPSec GW) network function that serves as a secure IP gateway. When the Security GW 245 is an IPSec GW, it can include protocols for establishing mutual authentication between agents at the beginning of a communication session and negotiation of cryptographic keys to be used during the session to protect communication over IP networks. A mobility management entity (MME) network function, such as the MME 240 of the ground station interface 220, can manage authentication and authorization of a UE, facilitate the UE access to the network to gain IP connectivity and manage the communication with the UE and a home subscriber server, such as the HSS 275 of carrier system 225, discussed below. A serving gateway (SGW) 250 provides a gateway to the evolved packet core (EPC) of the carrier network. While FIG. 2 shows the example Internet connectivity system 200 as having only a single ground station interface system 220, in practical implementations, the Internet connectivity system 200 can include multiple ground station interface systems 220, with each ground station interface system 220 serving one or more ground stations, such as the ground station 215.

In addition, the ground station interface 220 includes an attachment monitoring client 235. In some implementations, the attachment monitoring client 235 can be implemented as computer executable instructions stored in non-transitory computer readable media, such as computer memory, and which is executed by a general purpose processor. For example, the attachment monitoring client 235 can be executed on the same processor executing the MME 240 network function. In some other implementations, the attachment monitoring client 235 can be executed on a different processor than that which executes the MME 240 network function. In some implementations, the attachment monitoring client 235 may be located in an edge data center. In some implementations, the attachment monitoring client 235 may be implemented as part of the MME 240 network function. In some implementations, the attachment monitoring client 235 may be implemented as part of a diameter routing agent (DRA).

The attachment monitoring client 235 is generally configured to detect successful UE attachment to a carrier. In some implementations, the attachment monitoring client 235 is configured to detect successful UE attachment to a carrier by monitoring communications between the MME 240 and a home subscriber server (HSS) network function, such as the HSS 275, included in the carrier system 225, discussed further below. The attachment monitoring client 235 is also generally configured to notify the notification processing system 296 when a successful attachment of a UE, such as the UE 210, to the network of the carrier, such as the carrier system 225, is detected.

In FIG. 2, the attachment monitoring client 235 can detect a successful UE 210 attachment by identifying network protocol messages associated with the attachment of the UE 210 to the network of a carrier, such as carrier system 225. In some implementations, the UE 210 can request attachment to the network of the carrier system 225 through the mobile access point 205 and the ground station 215. In this case, the attachment monitoring client 235 can monitor the network protocol messages between the MME 240 and a home subscriber server (HSS), such as the HSS 275 of the carrier system 225, and extract relevant parameters from the monitored network protocol messages in order to detect attachment requests by the UE 210 to the network of the carrier system 225. The home subscriber server (HSS) 275 can be a central database containing user and subscription related information. In some implementations, the attachment monitoring client 235 can detect successful attachment by the UE 210 to the carrier system 225 by monitoring device attachment message sequences between the MME 240 and the HSS 275 over a communication interface 236. In some implementations, the interface 236 may be a S6a interface. For example, the attachment monitoring client 235 can monitor for the receipt by the MME of a Diameter Update Location Acknowledge message transmitted by the HSS 275 that includes the UE subscriber profile. In some other implementations, the attachment monitoring client can monitor for the transmission of an update location request (ULR) message by the MME 240 to the HSS 275 indicating successful authentication of the UE.

In some other implementations, the attachment monitoring client 235 monitors for a create session response message originating from a packet data network gateway 225 of the carrier system. In some other implementations, the attachment monitoring client 235 is configured to receive direct notification of a successful UE attachment from the HSS 275 of the carrier system 225. In still some other implementations, the attachment monitoring client 235 awaits detection of a Set up Forwarding Tunnel message being transmitted to the carrier system 225 before determining that a successful attachment has been made.

In FIG. 2, in response to detecting the successful attachment of the UE 210 to the carrier system 225, the attachment monitoring client 235 notifies the notification processing system 296 of the attachment by sending an attachment notification message to the notification processing system 296.

As indicated above, the Internet connectivity system 200 includes a carrier system 225. The carrier system 225 is generally configured to serve as an interface between a carrier and the ground station interface system 220 and a carrier and the notification processing system 296. The carrier system 225 includes a home subscriber server (HSS) 275, a mobile switching center (MSC) 280 and a packet data network gateway (PGW) 285. The home subscriber service (HSS), such as the HSS 275 of the carrier system 225, can be a central database containing user and subscription related information. The mobile switching center, such as the MSC 280 of the carrier system 225, can set up and release the end-to-end connections with UEs and also be responsible for charging and real time pre-paid account monitoring. The packet data network gateway, such as the PGW 285 of the carrier system 225, can provide connectivity from a UE to external data networks by being the point of exit and entry of traffic for the UE. The PGW 285 interfaces with an online charging system (OCS), such as the OCS 290, and a policy control and charging rules function (PCRF), such as the PCRF 295. The online charging system (OCS) 290 can be a system for allowing a communications service provider to charge its customers, in real time, based on service usage. The policy control and charging rules function (PCRF) 295 can be a software component that accesses subscriber databases and other specialized functions such as a charging system.

As indicated above, when the attachment monitoring client 235 detects a successful attachment by the UE 210 to the network of the carrier system 225, the attachment monitoring client 235 notifies the notification processing system 296 of the successful attachment by sending the notification processing system 296 an attachment notification message. In some implementations, the attachment notification message includes at least the device identification of the UE 210 and a timestamp. In some implementations, the device identification of the UE 210 can be the mobile station international subscriber directory number (MSISDN) for the UE 210. In some implementations, the MSISDN can be the phone number for the UE 210. In some implementations, the attachment notification message can include the international mobile equipment identity (IMEI) of the UE 210. In some implementations, the IMEI of the UE 210 can be co-located with an existing entity such as the MME 240. In some other implementations, the IMEI of the UE 210 can be co-located with a different entity such as a diameter proxy.

As indicated above, the Internet connectivity system 200 also includes a notification processing system 296. The notification processing system 296 is generally configured to receive notice of successful attachment of the UEs from each of the multiple station interface systems 220 included in the Internet connectivity system 200 and based on receipt of such notifications, generate Internet availability messages for transmission to the respective UEs. In some implementations, the notification processing system 296 can be located remotely from the ground station interface system 220. In some other implementations, the notification system 296 and the ground station interface system 220 can be co-located. The notification processing system 296 includes an attachment notification aggregator 260, one or more Internet availability messaging servers 265 and a mobile gateway 270.

The attachment notification aggregator 260 is generally configured to receive and aggregate attachment notifications of successful UE attachments from multiple attachment monitoring clients 235 associated with different carrier systems 225. In some implementations, the attachment notification aggregator 260 advertises one or more IP addresses for the notification processing system 296 and forwards the received attachment notifications to one of the Internet availability messaging servers 265. In some implementations, the attachment notification aggregator 260 implements a load balancing functionality to distribute received attachment notifications among the Internet availability messaging servers 265 to improve throughput and scalability of the system. However, in some implementations, the notification processing system 296 can omit the attachment notification aggregator 260, in favor of direct communication between attachment monitoring clients 235 and associated Internet availability messaging servers 265. In some implementations, the attachment notification aggregator 260 can interface with the Internet availability messaging servers 265 via a stubby interface. In some implementations, the attachment notification aggregator 260 can use an edge remote procedure call (RPC) or protocol to interface with the multiple attachment monitoring clients 235.

The Internet availability messaging servers 265 are generally configured to receive notifications of a UE attachment to respective carrier systems, such as carrier system 225, generate Internet availability messages to be transmitted by a carrier to the UEs 210 indicating the availability of Internet service through the carrier system 225, forward such messages to the respective carrier systems and in some implementations, collect statistics about the UE 210 attachments and customize messages.

In FIG. 2, the Internet availability messaging servers 265 generate an Internet service availability notification message for the UE 210. The Internet availability messaging servers 265 interface with mobile gateway 270 for transmitting the Internet service availability notification messages to the carrier system 225. In some implementations, the Internet service availability notification messages for the UE 210 may be in the form of a short messaging service (SMS). In some implementations, the availability notification messages may in the form of a multimedia messaging service (MMS), an enhanced messaging service (EMS) or the message may use an instant messaging program. In some implementations, the messages may be generic to all users. In some implementations, the messages may be customized for the end users. In some implementations, the mobile gateway 270 can be used for sending the Internet service availability notification messages to end users of UEs worldwide. The Internet availability messaging servers 265 can send the Internet service availability notification messages to the MSC 280 that connects the carrier system 225 to the mobile gateway 270. The MSC 280 can deliver the Internet service availability notification message over the interface 237 to the MME 240. In some implementations, the interface 237 can be a SGs interface. The MME 240 can deliver the Internet service availability notification message to the UE 210 via the mobile access point 205. In some implementations, the availability notification message can be delivered using a Non-Access Stratum (NAS) protocol.

As indicated above, the Internet availability messaging servers 265 can be configured to collect analytics. In some implementations, the collected analytics can include UE attachment statistics associated with the mobile access points 205. These statistics can be collected by receiving responses from the UEs related to the Internet service availability notification messages. In some implementations, the Internet service availability notification messages can be customized. For example, the notification message can include subscriber information such as the name of the end user. In some implementations, the notification message can be customized to identify the current location and/or carrier system the UE has attached to. In some implementations, the Internet service availability notification message may be customized based on the collected attachment statistics. In some implementations, the collected analytics may be used by the carriers to adjust service parameters for the UEs. In some implementations, the collected attachment statistics may be used by the carriers to adjust service parameters for the UEs. For example, in some implementations, the notification processing system may instruct the carrier system to limit the bandwidth made available to the UE based on the number of UEs attached to the mobile access point. In some implementations, the notification processing system may instruct the carrier system to limit the bandwidth made available to the UE based on the present rate of UE attachment, as the rate of UE attachments may be indicative of near term constraints on bandwidth that might not be immediately present. In some implementations, in addition or instead of just looking at the present load on the mobile access points and/or rate of UE attachment, the notification processing system may implement predictive logic to forecast near term changes in bandwidth usage based on the current operating statistics and past history. In some implementations, the collected attachment statistics for an end user may be used by a carrier to offer customized rate and data plans. In some implementations, the customized rate and data plans may be based on the UE geography, UE home geography and other analytics such as the current load or the rate of change of the load on a mobile access point/ground station. The availability notification can be customized to inform the user of the UE of the bandwidth, usage, or pricing modifications determined by the notification processing system based on the analytics discussed above.

In some implementations, the Internet availability messaging servers 265 can be configured to implement messaging control. Messaging control may include customizing the generated Internet service availability notification messages, rate-limiting message origination, message delivery confirmation and message re-origination. In some implementations, the end user billing related to the delivery of the Internet service availability notification messages to the UEs may be based on the existing infrastructure of the carrier, such as carrier system 225. In some implementations, the OCS 290, the PGW 285 and the interface 238 of the carrier system 225 may be used for implementing pre-paid charging for the messages. In some implementations, the rate-limiting of message origination may be used to avoid spamming the end users of the UEs, especially, but not limited to the case of repeated UE attachments to the carrier systems.

In some implementations, the Internet availability messaging servers 265 can initiate an Internet service availability notification message for the UE 210 which includes a request for the end user of UE 210 to indicate whether the end user wishes to opt-in or opt-out from joining the available network of the carrier system 225. In some implementations, if the end user of UE 210 does not respond to the request within a threshold amount of time, the end-to-end Internet connection for the UE 210 can be terminated by the MME 240. In some implementations, if the end user of UE 210 responds by indicating that the end user wishes to join the available network of the carrier system 225, the UE 210 is allowed to join the network and access the Internet service. In some implementations, if the end user of UE 210 responds by indicating that the end user wishes to opt-out from joining the available network of carrier system 225, the end-to-end Internet connection for the UE 210 can be terminated by the MME 240.

Figure 3:
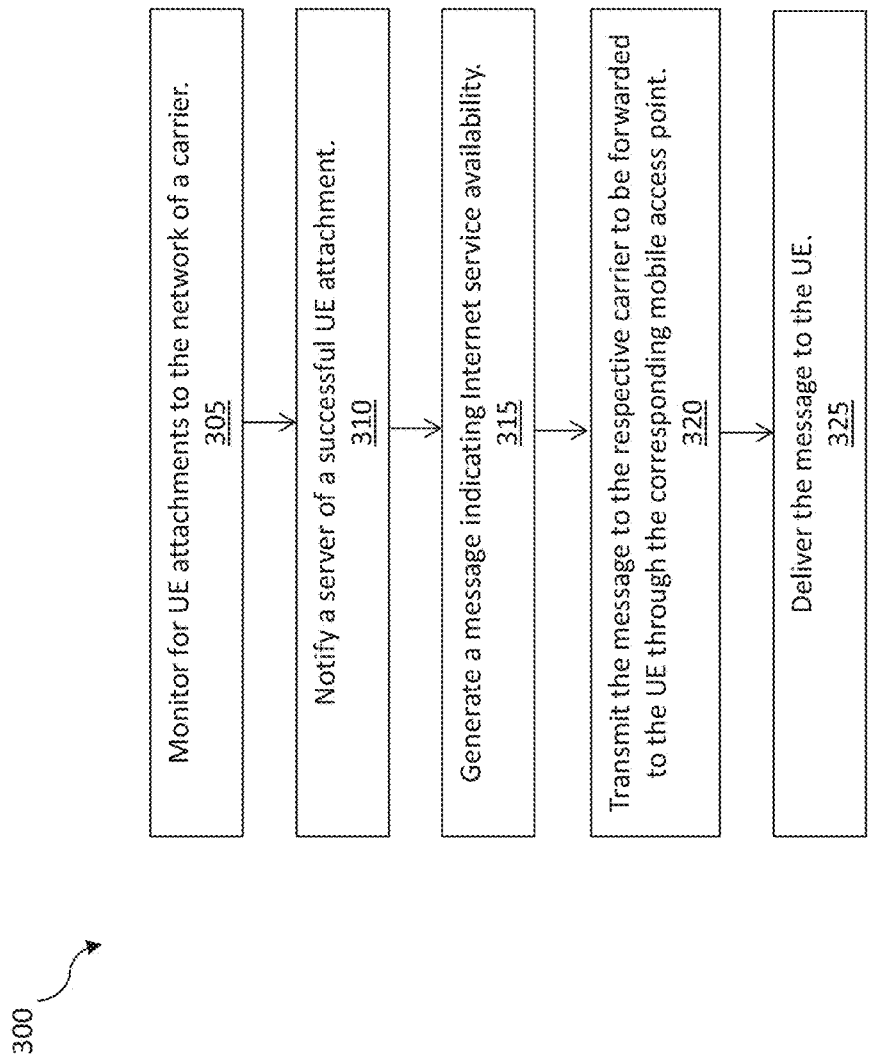
FIG. 3 shows an example flow diagram of an Internet notification method executed by the Internet connectivity system shown in FIG. 2.

FIG. 3 is an example flow diagram of an Internet notification method 300 executed by the Internet connectivity system 200 shown in FIG. 2. The Internet notification method 300 includes monitoring for successful UE attachments to a carrier (stage 305), notifying a server of a successful UE attachment (stage 310), generating a message indicating Internet service availability (stage 315), transmitting the generated message to the respective carrier to be forwarded to the UE through a corresponding mobile access point (stage 320) and delivering the message to the UE (stage 325).

The Internet notification method 300 includes monitoring for successful UE attachments to a carrier (stage 305). The UE attachments can be monitored by an attachment monitoring client 235 identifying network protocol messages associated with the attachment of a UE, such as UE 210, to the network of a carrier, such as carrier system 225. In some implementations, the attachment monitoring client 235 can detect attachment requests by a UE to the network of the carrier system 225 by monitoring the network protocol messages or device attachment message sequences between the ground station interface system 215 and the carrier system 225. In some other implementations, the attachment monitoring client 235 can receive direct notification of a successful UE attachment from the carrier system 225. The Internet notification method 300 includes notifying a server of a successful UE attachment (stage 310). In the Internet connectivity system 200, the attachment monitoring client 235 notifies the notification processing system 296 of the successful UE attachment by sending the notification processing system 296 an attachment notification message including the device identification of the attached UE. The Internet notification method 300 includes generating a message indicating Internet service availability (stage 315). In the Internet connectivity system 200, the Internet availability messaging servers 265 can generate an Internet service availability notification message for the UE, such as UE 210. The Internet notification method 300 includes transmitting the generated message to the respective carrier to be forwarded to the UE through a corresponding mobile access point (stage 320). In the Internet connectivity system 200, the Internet availability messaging servers 265 can transmit the generated Internet service availability notification messages to the carrier system 225 to be forwarded by the carrier system 225 to the UE 210 through the corresponding mobile access point 205. The Internet notification method 300 includes delivering the message to the UE (stage 325). In the Internet connectivity system 200, the Internet service availability notification message can be delivered to the UE 210 by the carrier system 225 through the ground station interface system 215 and mobile access point 205.

In some implementations, the Internet notification method 300 can include collecting analytics. In the Internet connectivity system 200, the Internet availability messaging servers 265 can collect analytics including UE attachment statistics associated with mobile access points, such as mobile access point 205. These attachment statistics can be collected by receiving responses from the UEs related to the Internet service availability notification messages. In some implementations, the Internet notification method 300 can include customizing the Internet service availability notification messages. In some implementations, the Internet service availability notification messages can be customized based on the collected analytics. The customization of messages is described in greater detail above. In some implementations, the collected analytics may be used by the carriers, such as carrier system 225, to adjust carrier related service to the UEs. The use of collected analytics by a carrier is described in greater detail above.

In some implementations, the Internet notification method 300 can include implementing message control. In the Internet connectivity system 200, the Internet availability messaging servers 265 can control customizing the generated Internet service availability notification messages, rate-limiting message origination, message delivery confirmation and message re-origination. In some implementations, the end user billing related to the delivery of the Internet service availability notification messages to the UEs may be based on the existing infrastructure of the carrier, such as carrier system 225.

In some implementations, the notification messages can also be used to provide users an explicit option to opt in or out of joining the network which has been determined to be available. That is, just because a network has become available to a UE, the user of the UE may not want to take advantage of that access, for example to avoid paying for data charges that might be incurred as a result of data traffic being transmitted to the UE without the UE's explicit request. For example, UEs often execute mail applications that regularly transmit requests to mail servers to download unread mail applications without the need for UE user interaction. Such requests could result in the transmission of significant amounts of data to the UE, which the user of the UE may not want to pay for at data rates offered by the carrier system.

FIG. 4 is a flow diagram of an Internet notification method 400 that includes requesting the end user to indicate whether the end user desires to join the available network, executed by the Internet connectivity system shown in FIG. 2. The Internet notification method 400 includes monitoring for successful UE attachments to a carrier (stage 405) and notifying a server of a successful UE attachment (stage 410), also shown in stage 305 and stage 310 of FIG. 3. The Internet notification method 400 includes generating a message including an Internet service availability notification and a request to join the available network (stage 415). In the Internet connectivity system 200, the Internet availability messaging servers 265 generate an Internet service availability notification message for the UE 210 that Internet service is available through the network of carrier system 225. The Internet service availability notification message for the UE 210 includes a request for the end user of UE 210 to indicate whether the end user wishes to opt in to or opt out from joining the available network.

The Internet notification method 400 includes transmitting the generated message to the respective carrier to be forwarded to the UE through a corresponding mobile access point (stage 420) and also shown in stage 320 of FIG. 3. In the Internet connectivity system 200, the Internet availability messaging servers 265 can transmit the generated messages to the carrier system 225 to be forwarded by the carrier system 225 to the UE 210 through the corresponding mobile access point 205. The Internet notification method 400 includes delivering the message to the UE (stage 425) and also shown in stage 325 of FIG. 3. In the Internet connectivity system 200, the Internet service availability notification message is delivered to the UE 210 by the carrier system 225 through the ground station interface system 215 and the mobile access point 205.

The Internet notification method 400 includes determining whether a response was received from the end user of the UE 210 indicating that the end user wishes to opt in to or opt out from joining the available network (stage 455). If no response is received from the end user of UE 210 within a threshold amount of time (e.g., about 1 minutes, about 5 minutes, or about 10 minutes) (stage 450), the method 400 includes ending the session for UE 210 (stage 460). If a response is received from the UE 210 within the threshold amount of time (stage 450), the method 400 includes determining whether the response indicates a desire to join the network or to refrain from joining the network (stage 455). If the response indicates a desire to join the available network (stage 455), the method 400 includes enabling the usage of the available Internet connectivity services for UE 210 (stage 465). If the response indicates a desire to not join the available network (stage 455), the method 400 includes ending the session for UE 210 (stage 460).

FIG. 5 shows a block diagram of an example computing system 500. In some implementations, the computing system 500 may be utilized in implementing the Internet notification methods 300 and 400 in FIGS. 3 and 4.

In broad overview, the computing system 510 includes at least one processor 550 for performing actions in accordance with instructions and one or more memory devices 570 or 575 for storing instructions and data. The illustrated example computing system 510 includes one or more processors 550 in communication, via a bus 515, with at least one network interface controller 520 with network interface ports 522(a-n) connecting to other computing devices 512(a-n), memory 570, and any other devices 580, e.g., an I/O interface. Generally, a processor 550 will execute instructions received from memory. The processor 550 illustrated incorporates, or is directly connected to, cache memory 575.

In more detail, the processor 550 may be any logic circuitry that processes instructions, e.g., instructions fetched from the memory 570 or cache 575. In many embodiments, the processor 550 is a microprocessor unit or special purpose processor. The computing device 500 may be based on any processor, or set of processors, capable of operating as described herein. In some implementations, the processor 550 can be capable of executing the Internet notification methods 300 and 400 shown in FIGS. 3 and 4. The processor 550 may be a single core or multi-core processor. The processor 550 may be multiple processors. In some implementations, the processor 550 can be configured to run multi-threaded operations. In some implementations, the processor 550 may host one or more virtual machines or containers, along with a hypervisor or container manager for managing the operation of the virtual machines or containers. In such implementations, one or more of the methods 300 and 400 shown in FIGS. 3 and 4 can be implemented within the virtualized or containerized environments provided on the processor 550.

The memory 570 may be any device suitable for storing computer readable data. The memory 570 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, and BluRay® discs). A computing system 500 may have any number of memory devices 570. In some implementations, the memory 570 can include instructions corresponding to the Internet notification methods 300 and 400 shown in FIGS. 3 and 4. In some implementations, the memory 570 supports virtualized or containerized memory accessible by virtual machine or container execution environments provided by the computing system 510.

The cache memory 575 is generally a form of computer memory placed in close proximity to the processor 550 for fast read times. In some implementations, the cache memory 575 is part of, or on the same chip as, the processor 550. In some implementations, there are multiple levels of cache 575, e.g., L2 and L3 cache layers.

The network interface controller 520 manages data exchanges via the network interfaces 522(a-n) (also referred to as network interface ports). The network interface controller 520 handles the physical and data link layers of the OSI model for network communication. In some implementations, some of the network interface controller's tasks are handled by the processor 550. In some implementations, the network interface controller 520 is part of the processor 550. In some implementations, a computing system 510 has multiple network interface controllers 520. The network interfaces 522(a-n) are connection points for physical network links. In some implementations, the network interface controller 520 supports wireless network connections and an interface port 522 is a wireless receiver/transmitter. Generally, a computing device 510 exchanges data with other computing devices 512(a-n) via physical or wireless links to a network interfaces 522(a-n). In some implementations, the network interface controller 520 implements a network protocol such as Ethernet.

The other computing devices 512(a-n) are connected to the computing device 510 via a network interface port 522. The other computing devices 512(a-n) may be peer computing devices, network devices, or any other computing device with network functionality. For example, a first computing device 512(a) may be a network device such as a hub, a bridge, a switch, or a router, connecting the computing device 510 to a data network such as the Internet.

The other devices 580 may include an I/O interface, external serial device ports, and any additional co-processors. For example, a computing system 510 may include an interface (e.g., a universal serial bus (USB) interface) for connecting input devices (e.g., a keyboard, microphone, mouse, or other pointing device), output devices (e.g., video display, speaker, or printer), or additional memory devices (e.g., portable flash drive or external media drive). In some implementations, a computing device 500 includes an additional device 580 such as a coprocessor, e.g., a math co-processor can assist the processor 550 with high precision or complex calculations.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources. The operations may be executed within the native environment of the data processing apparatus or within one or more virtual machines or containers hosted by the data processing apparatus.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers or one or more virtual machines or containers that are located at one site or distributed across multiple sites and interconnected by a communication network. Examples of communication networks include a local area network ("LAN") and a wide area network ("WAN"), an inter-network (e.g., the Internet), and peer-to-peer networks (e.g., ad hoc peer-to-peer networks).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method comprising:
    receiving, from a plurality of attachment monitoring clients, by a notification processing system, indications of successful attachments of a plurality of user equipment with a plurality of different respective telecommunications carriers through corresponding ones of a plurality of access nodes, wherein the user equipment are in communication with the corresponding access nodes via one or more mobile access points, wherein the notification processing system is independent of the different telecommunications carriers;
    for a plurality of the successful user equipment attachments included in the indications received from the plurality of attachment monitoring clients, generating, by a server process of the notification processing system, respective service availability notifications; and
    transmitting by the notification processing system the generated service availability notifications to systems of the respective carriers to be forwarded by the respective carriers to the user equipment through the corresponding access nodes.

2. The method of claim 1, further comprising:
    collecting attachment statistics for each of the plurality of access nodes.

3. The method of claim 2, wherein collecting attachment statistics comprises:
    receiving responses originating from the user equipment to the service availability notifications and collecting attachment statistics based on the received responses.

4. The method of claim 3, further comprising:
    customizing at least one of the service availability notifications based on the collected attachment statistics.

5. The method of claim 4, further comprising:
customizing at least one of notification delivery confirmation, notification re-origination, rate limiting notification origination, notification content analysis or notification error handling.

6. The method of claim 3, further comprising:
using the collected attachment statistics for planning network resources, wherein the collected attachment statistics include at least one of a duration of Internet use or aggregate Internet usage.

7. The method of claim 3, further comprising:
causing at least one of the carriers to adjust service parameters for at least one user equipment based on the collected attachment statistics.

8. The method of claim 1, further comprising:
initiating the termination of an Internet connection for a user equipment based on a received response originating from the user equipment to a service availability notification or the absence of a received response.

9. The method of claim 1, wherein the access node comprises an Internet gateway or a network node associated with establishing an Internet connection for the UE.

10. The method of claim 1, wherein the attachment monitoring client is executing in an access node.

11. A notification processing system comprising:
one or more processors implementing a client configured to:
receive, from a plurality of attachment monitoring clients, indications of successful attachments of a plurality of user equipment with a plurality of different respective telecommunications carriers through corresponding ones of a plurality of access nodes, wherein the user equipment are in communication with the corresponding access nodes via one or more mobile access points, wherein the client is independent of the different telecommunications carriers; and
one or more process servers, which are independent of the different telecommunications carriers, configured to:
for a plurality of the successful user equipment attachments included in the indications received from the plurality of attachment monitoring clients, generate respective service availability notifications; and
transmit by the process servers the generated service availability notifications to systems of the respective carriers to be forwarded by the respective carriers to the user equipment through the corresponding access nodes.

12. The system of claim 11, wherein the client is further configured to:
collect attachment statistics for each of the plurality of access nodes.

13. The system of claim 12, wherein the client is configured to:
collect attachment statistics by receiving responses originating from the user equipment to the service availability notifications and collecting attachment statistics based on the received responses.

14. The system of claim 12, wherein the client is further configured to:
customize at least one of the service availability notifications based on the collected attachment statistics.

15. The system of claim 12, further configured to:
cause at least one of the carriers to adjust service parameters for at least one user equipment based on the collected attachment statistics.

16. The system of claim 11, wherein the access node comprises an Internet gateway or a network node associated with establishing an Internet connection for the UE.

17. The system of claim 11, wherein the access monitoring client executes within an access node.

18. A non-transitory computer readable medium having instructions encoded thereon which, when executed by one or more processors of a notification processing system, which is independent from a plurality of different telecommunications carriers, cause the notification processing system to perform a method, the method comprising:
receiving, from a plurality of attachment monitoring clients, indications of successful attachments of a plurality of user equipment with a plurality of the different telecommunications carriers through corresponding ones of a plurality of access nodes, wherein the user equipment are in communication with the corresponding access nodes via one or more mobile access points;
for a plurality of the successful user equipment attachments included in the indications received from the plurality of attachment monitoring clients, generating by a server process of the notification processing system respective service availability notifications; and
transmitting by the server process of the notification processing system, service availability notifications to systems of the respective carriers to be forwarded by the respective carriers to the user equipment through the corresponding access nodes.

19. The non-transitory computer-readable medium of claim 18, wherein the method further comprises:
collecting attachment statistics for each of the plurality of access nodes.

20. The non-transitory computer-readable medium of claim 19, wherein collecting attachment statistics comprises:
receiving responses originating from the user equipment to the service availability notifications and collecting attachment statistics based on the received responses.

21. The non-transitory computer-readable medium of claim 19, wherein the method further comprises:
customizing at least one of the service availability notifications based on the collected attachment statistics.

22. The non-transitory computer-readable medium of claim 19, wherein the method further comprises:
causing at least one of the carriers to adjust service parameters for at least one user equipment based on the collected attachment statistics.

23. The non-transitory computer-readable medium of claim 19, wherein the access node comprises an Internet gateway or a network node associated with establishing an Internet connection for the UE.

* * * * *